Patented Feb. 11, 1941

2,231,705

UNITED STATES PATENT OFFICE 2,231,705

AZO COMPOUNDS AND MATERIAL COLORED THEREWITH

Joseph B. Dickey, Rochester, N. Y., assignor to Eastman Kodak Company, Rochester, N. Y., a corporation of New Jersey No Drawing. Application September 15, 1939, Serial No. 295,081

12 Claims. (Cl. 260—155)

This invention relates to arylazo compounds and their application to the art of dyeing or coloring.

I have discovered that the azo compounds having the general formula:

$$R-N=N-R_1$$

wherein R represents the residue of a member selected from the group consisting of an aryl nucleus of the benzene series, an aryl nucleus of the naphthalene series and a benzothiazole nucleus, and $R_1$ represents the residue of a hydrogented 2,4-dihydroxyquinoline, constitute a valuable class of compounds. Depending upon their structure, the azo compounds of my invention possess application for the dyeing or coloration of organic derivatives of cellulose, cotton, silk, wool and regenerated cellulose.

Both sulfonated and non-sulfonated compounds are included within the scope of my invention. The nuclear non-sulfonated compounds have been found to be especially of value for the dyeing of organic derivatives of cellulose and it is to these compounds and their application for the dyeing of organic derivatives of cellulose that my invention is particularly directed. These nuclear non-sulfonated compounds likewise possess some application for the dyeing of wool and silk. For the dyeing of organic derivatives of cellulose, such as cellulose acetate silk, nuclear non-sulfonated dye compounds, wherein R is an aryl nucleus of the benzene series, are generally advantageous.

The nuclear sulfonated compounds of my invention have little or no utility for the dyeing of organic derivatives of cellulose but possess application for the dyeing of regenerated cellulose, cotton, silk and wool. Preferably when the dye compounds of my invention are to be employed for the dyeing of organic derivatives of cellulose, they should contain no nuclear free carboxylic acid group. Red, yellow, orange-yellow and greenish-yellow dyeings, for example, can be obtained employing the dye compounds of my invention.

It is an object of my invention to provide a new class of azo dyes suitable for the dyeing or coloration of textile materials made of or containing an organic derivative of cellulose, wool, silk, cotton and regenerated cellulose. Another object of my invention is to provide a process for the dyeing or coloration of organic derivatives of cellulose, wool, silk, cotton and regenerated cellulose. A further object is to produce dyed textile materials which are of good fastness to light and washing. A particular object of my invention is to provide a new class of nuclear non-sulfonated azo dyes suitable for the dyeing or coloration of cellulose acetate silk. Other objects will hereinafter appear.

Typical organic derivatives of cellulose include the hydrolyzed as well as the unhydrolyzed cellulose organic acid esters such as cellulose acetate, cellulose formate, cellulose propionate or cellulose butyrate and the hydrolyzed as well as the unhydrolyzed mixed organic acid esters of cellulose such as cellulose acetate-propionate, cellulose acetate-butyrate and the cellulose ethers such as methyl cellulose, ethyl cellulose or benzyl cellulose. While my invention will be illustrated more particularly in connection with the coloration of cellulose acetate silk, a material to which the invention is especially adapted, it will be understood that it applies to the coloration of other organic derivatives of cellulose such as those just named as well as to the coloration of wool, silk, cotton and regenerated cellulose.

The azo dye compounds of my invention can be prepared by diazotizing a suitable arylamine and coupling the diazonium compound obtained with a hydrogenated 2,4-dihydroxyquinoline capable of coupling.

While any 2,4-dihydroxyquinoline compound capable of coupling can be employed in the preparation of the azo dye compounds of my invention, the 2,4-dihydroxyquinoline coupling components ordinarily employed by me are selected from the group of compounds having the general formulae:

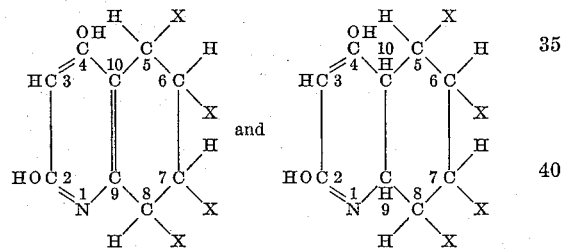

wherein X represents a member selected from the group consisting of hydrogen, a hydroxyl group, an alkyl group, an alkoxy group, an amino group, a halogen atom, a carboxyl group, and a sulfo group. For purposes of clarity, the 2,4-dihydroxyquinoline nuclei shown above have been numbered. This numbering is that which will be employed herein. Coupling is believed to take place in the three-position. Accordingly, no group should be present in this position and no group which would prevent coupling should be present.

It will be understood that alkyl, as used herein, unless otherwise indicated, includes not only unsubstituted alkyl groups such as a methyl group, an ethyl group, a propyl group, or a butyl group but also substituted alkyl groups such as β-hydroxyethyl, β,γ-hydroxypropyl, β-hydroxypropyl, β-methoxyethyl or β-ethoxyethyl, for example. Similarly, the term "alkoxy" includes not only unsubstituted alkoxy groups such as methyl, ethoxy, a propoxy or a butoxy group but also substituted alkoxy groups such as β-methoxyethoxy, β-ethoxyethoxy or β'-hydroxyethoxy-β-ethoxy, for example. Illustrative of halogen may be mentioned chlorine, bromine and iodine.

The coupling components employed in the preparation of the dye compounds of my invention are subject to tautomerism and can exist in either their "enol" or their "keto" form. The formulae given to represent the coupling components ordinarily employed are in the so-called "enol" form. Represented in their "keto" form, these compounds would have the following formulae:

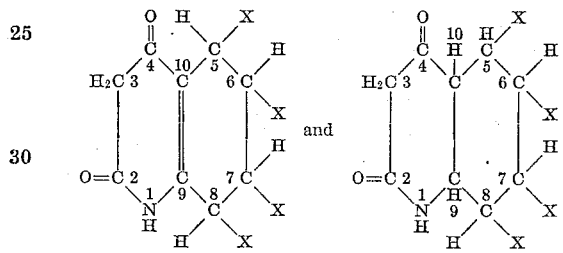

wherein X has the meaning previously assigned to it. It will be understood, however, that regardless of which form is employed that so far as the present invention is concerned the compounds, whether in their "enol" or "keto" form, are one and the same.

The following examples illustrate the preparation of the azo dye compounds of my invention.

*Example 1*

13.7 grams of o-phenetidine are dissolved in 200 cc. of water containing about 36 grams of 36% hydrochloric acid. The resulting solution is cooled to a temperature approximating 0–5° C. by the addition of ice, for example, and diazotized while maintaining a temperature of about 0–5° C. by adding, with stirring, 6.9 grams of sodium nitrite dissolved in water.

16.5 grams of 5,6,7,8 - tetrahydro - 2,4 - dihydroxyquinoline are dissolved in 300 parts of water containing 31.8 parts of sodium carbonate. The resulting solution is cooled to a temperature approximating 0–10° C. and the diazo solution prepared above is slowly added with stirring while maintaining said temperature. Upon completion of the coupling reaction which takes place, the mixture is made acid to litmus by the addition of acetic acid and the precipitated dye compound formed is recovered by filtration, washed with water and dried. The dye compound obtained colors cellulose acetate silk, wool and silk a greenish yellow shade.

By the substitution of an equivalent gram molecular weight of 7-ethyl-5,6,7,8-tetrahydro-2,4-dihydroxyquinoline for the coupling component of the example a dye compound included within the scope of the invention can be obtained.

*Example 2*

.1 gram mole of p-β-methoxyethoxyaniline is diazotized in known fashion and the diazonium compound obtained is coupled with .1 gram mole of 5,6,7,8,9,10-hexahydro - 7 - methyl - 2,4 - dihydroxyquinoline. The diazotization and coupling reactions may be carried out in accordance with the general method described in Example 1. The dye compound obtained colors cellulose acetate silk, wool and silk a greenish-yellow shade.

By the substitution of equivalent gram molecular weights of 5,6,7,8,9,10-hexahydro-5-ethyl-2,4-dihydroxyquinoline, 5,6,7,8,9,10-hexahydro-6-hydroxy - 2,4 - dihydroxyquinoline and 5,6,7,8,9,10-hexahydro-5-methoxy - 2,4 - dihydroxyquinoline, for example, for the coupling component of the example, further dye compounds which color cellulose acetate silk, wool and silk and which are included within the scope of my invention can be obtained.

*Example 3*

.1 gram mole of 1-amino-2-nitro-4-chlorobenzene is diazotized and the diazonium compound obtained is coupled with .1 gram mole of 5,6,7,8-tetrahydro-8-hydroxy - 2,4 - dihydroxyquinoline. Diazotization, coupling and recovery of the dye compound can be carried out as described in Example 1. The dye compound obtained colors cellulose acetate silk, wool and silk a greenish-yellow shade.

By the substitution of equivalent gram molecular weights of 5,6,7,8,-tetrahydro-5-chloro-2,4-dihydroxyquinoline, 5,6,7,8-tetrahydro-6-chloro-2,4-dihydroxyquinoline, 5,6,7,8-tetrahydro-8-propyl-2,4-dihydroxyquinoline, 5,6,7,8-tetrahydro-8-β-hydroxyethylamino-2,4-dihydroxyquinoline and 5,6,7,8-tetrahydro-5-glycerylamino-2,4-dihydroxyquinoline for the coupling component of the example, dye compounds which color cellulose acetate silk, wool and silk and which are included within the scope of my invention can be obtained.

*Example 4*

.1 gram mole of 1-amino-2-methyl-4-nitrobenzene is diazotized and the diazonium compound obtained is coupled with .1 gram mole of 5,6,7,-8,9,10-hexahydro-5-hydroxy-2,4-dihydroxyquinoline. Diazotization, coupling and recovery of the dye compound may be carried out as described in Example 1. The dye compound obtained colors cellulose acetate silk, wool and silk a greenish-yellow shade.

*Example 5*

.1 gram mole of

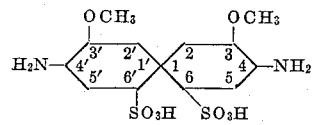

is diazotized in known fashion and the diazonium compound obtained is coupled with .2 gram moles of 5,6,7,8-tetrahydro - 7 - methyl-2,4-dihydroxyquinoline. Coupling and recovery of the dye compound formed can be carried out in accordance with the method described in Example 1. The dye compound obtained colors wool, silk, cotton and regenerated cellulose a yellow shade.

*Example 6*

.1 gram mole of 1-amino-4-nitro-6-sulfobenzene are diazotized in known fashion and the diazonium compound obtained is coupled with .1 gram mole of 5,6,7,8-tetrahydro-2,4-dihydroxyquinoline. Coupling and recovery of the dye compound formed can be carried out in accordance with the method described in Example 1.

The dye compound obtained colors wool, silk, cotton and regenerated cellulose a yellow shade.

The following tabulations further illustrate compounds included within the scope of my invention together with the color they produce on cellulose acetate silk, wool, silk, cotton and regenerated cellulose. The compounds indicated below may be prepared by diazotizing the amines listed under the heading "Amine" and coupling the diazonium compounds obtained with the compounds specified in the column entitled "Coupling component." The diazotization and coupling reactions may, for example, be carried out following the general procedure described in Examples 1 to 6, inclusive.

In order that the preparation of the azo dye compounds of my invention may be clearly understood, the preparation of the hydrogenated 2,4-dihydroxyquinoline compounds employed in their manufacture is indicated hereinafter.

The hydrogenated 2,4-dihydroxyquinoline compounds employed in the preparation of the azo compounds of my invention can be prepared by hydrogenation of the corresponding 2,4-dihydroxyquinoline compounds. Hydrogenation may be carried out in an alkaline solution in the presence of a catalyst such as Raney nickel. 2,4-dihydroxyquinoline can be prepared in a number of ways such as by heating o-aminophenylpropiolic acid with sulfuric acid; by the condensation

Table I

| Amine | Coupling component | Color on cellulose acetate silk, wool, and silk |
|---|---|---|
| o-Anisidine | (1) 5,6,7,8-tetrahydro-2,4-dihydroxyquinoline | Greenish-yellow. |
| Do | (2) 5,6,7,8,9,10-hexahydro-2,4-dihydroxyquinoline | Do. |
| Do | (3) 5,6,7,8,9,10-hexahydro-5-methyl-2,4-dihydroxyquinoline | Do. |
| Do | (4) 5,6,7,8-tetrahydro-5-hydroxy-2,4-dihydroxyquinoline | Do. |
| Do | (5) 5,6,7,8-tetrahydro-6-dimethyl-amino-2,4-dihydroxyquinoline | Do. |
| o-Phenetidine | Coupling components 1 to 5 | Do. |
| p-Phenetidine | ----do---- | Do. |
| o-Chloroaniline | ----do---- | Do. |
| 1-amino-2,6-dimethoxybenzene | ----do---- | Do. |
| 1-amino-2,6-diethoxybenzene | ----do---- | Do. |
| 1-amino-2-methoxy-5-chlorobenzene | ----do---- | Do. |
| o-Nitroaniline | ----do---- | Do. |
| 1-amino-2-nitro-4-(Cl, Br, F, I)-benzene | ----do---- | Do. |
| 1-amino-2-nitro-4-ethylbenzene | ----do---- | Do. |
| 1-amino-2-nitro-4-methoxybenzene | ----do---- | Do. |
| 1-amino-2-nitro-4-propoxybenzene | ----do---- | Do. |
| 1-amino-2-nitro-4-hydroxybenzene | ----do---- | Do. |
| 1-amino-2-hydroxy-4-nitrobenzene | ----do---- | Do. |
| 1-amino-2-chloro-4-nitrobenzene | ----do---- | Do. |
| 1-amino-2-propyl-4-nitrobenzene | ----do---- | Do. |
| 1-amino-2-methoxy-4-nitrobenzene | ----do---- | Do. |
| o,m,p-Aminoacetophenone | ----do---- | Do. |
| 1-amino-4-ethylketobenzene | ----do---- | Do. |
| 1-amino-4-methylsulfonebenzene | ----do---- | Do. |
| 1-amino-3-ethylsulfonebenzene | ----do---- | Do. |
| 1-amino-2-methylsulfonebenzene | ----do---- | Do. |
| 2-amino-6-ethoxybenzothiazole | ----do---- | Do. |
| Dianisidine | ----do---- | Do. |
| 1-amino-4-dimethylaminobenzene | ----do---- | Red. |
| 1-amino-4-diethylaminobenzene | ----do---- | Do. |
| p-Aminoazobenzene | ----do---- | Orange-yellow. |
| α-Naphthylamine | ----do---- | Do. |

Table II

| Amine | Coupling component | Color on silk, wool, cotton and regenerated cellulose |
|---|---|---|
| 1-amino-4-nitro-6-sulfobenzene | (1) 5,6,7,8-tetrahydro-2,4-dihydroxyquinoline | Yellow. |
| Do | (2) 5,6,7,8,9,10-hexahydro-2,4-dihydroxyquinoline | Do. |
| Do | (3) 5,6,7,8,9,10-hexahydro-5-methyl-2,4-dihydroxyquinoline | Do. |
| 1-amino-4-nitro-6 sulfobenzene | (4) 5,6,7,8-tetrahydro-5-hydroxy-2,4-dihydroxyquinoline | Do. |
| Do | (5) 5,6,7,8-tetrahydro-6-dimethylamino-2,4-dihydroxyquinoline | Do. |
| Do | (6) 5,6,7,8-tetrahydro-6-carboxyl-2,4-dihydroxyquinoline | Do. |
| Do | (7) 5,6,7,8-tetrahydro-7-sulfo-2,4-dihydroxyquinoline | Do. |
| 1-amino-4-dimethylamino-6-sulfobenzene | Coupling components 1 to 7 | Red. |
| 1-amino-5-di-β-hydroxyethylamino-6-sulfobenzene | ----do---- | Do. |
| 3,3'-dimethoxy-6,6'-disulfonicbenzidine | ----do---- | Yellow. |
| 1-amino-2-hydroxy-5-sulfonaphthalene | ----do---- | Do. |
| 2-amino-4,6-disulfonaphthalene | ----do---- | Do. |
| 1-amino-5-sulfonaphthalene | ----do---- | Do. |

It will be understood that the specific dye compounds given hereinbefore are intended to be illustrative and not limitative of the invention. Any of the amines disclosed herein may be diazotized and the diazonium compounds obtained coupled with any of the coupling components shown herein to obtain dye compounds included within the scope of my invention.

of anthranilic acid ester and acetic ester with sodium or from o-acetanthranilic acid ester by means of sodium. A still further way to prepare this compound is by the condensation of aniline with ethyl malonate. The substituted 2,4-dihydroxyquinolines can be prepared in a similar manner by the use of substituted starting components. Thus, alkyl and halogen substituted 2,4-dihydroxyquinolines can be prepared by condensing alkyl anilines and halogenated anilines with ethyl malonate, respectively. From this the preparation of the substituted 2,4-dihydroxyquinoline compounds should be clear.

Both water soluble and water insoluble azo dye compounds are included within the scope of my invention. Those compounds which are insoluble in water may be advantageously employed for the direct dyeing of textile materials by grinding the dye to a fine powder, intimately mixing it with a suitable dispersing or solubilizing agent and adding the resulting mixture to water or a dilute solution of soap in water to form an aqueous dyebath. Following this known preparation of the dyebath, the textile materials to be dyed may be added to the dyebath and the dyeing operation conducted in known fashion. For a more complete description of how the water insoluble azo dye compounds of my invention can be employed for the dyeing of organic derivatives of cellulose, reference may be had to McNally and Dickey U. S. Letters Patent No. 2,115,030, issued April 26, 1938. The water insoluble azo dye compounds of my invention, as previously noted, also possess application for the dyeing of wool and silk and they may be applied to these materials in the same manner as they are applied to the organic derivatives of cellulose.

The water soluble dye compounds of my invention may be applied to wool, silk, cotton, regenerated cellulose and (depending upon the nature and position of the water solubilizing group) organic derivatives of cellulose textile materials from an aqueous solution of the dye which may contain salt. These water soluble dye compounds can be applied to the fiber in substantially the same manner as the water insoluble dye compounds. In the case of the water soluble dye compounds, however, the use of a dispersing or solubilizing agent is not necessary. It will be understood, of course, that the above remarks concerning the application of the dye compounds of my invention are merely illustrative and that any of the customary methods for applying dyes of the character here involved to textile fibers can be employed.

I claim:

1. The azo compounds having the general formula:

$$R-N=N-R_1$$

wherein R represents the residue of a member selected from the group consisting of an aryl nucleus of the benzene series, an aryl nucleus of the naphthalene series and a benzothiazole nucleus and $R_1$ represents the residue of a 2,4-dihydroxyquinoline hydrogenated in positions 5 to 8 or 5 to 10, inclusive.

2. The azo compounds having the general formula:

$$R-N=N-R_1$$

wherein R represents the residue of an aryl nucleus of the benzene series and $R_1$ represents the residue of a 2,4-dihydroxyquinoline hydrogenated in positions 5 to 8 or 5 to 10, inclusive.

3. The azo compounds selected from the group of azo compounds having the general formulae:

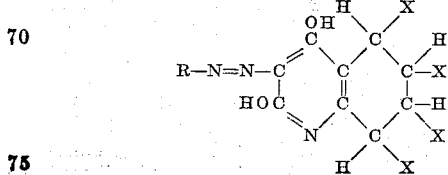

and

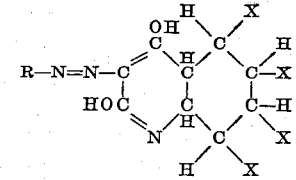

wherein R represents the residue of a member selected from the group consisting of an aryl nucleus of the benzene series, an aryl nucleus of the naphthalene series and a benzothiazole nucleus and X represents a member selected from the group consisting of hydrogen, a hydroxyl group, an alkyl group, an alkoxy group, an amino group, a halogen atom, a carboxyl group and a sulpho group.

4. The azo compounds having the general formula:

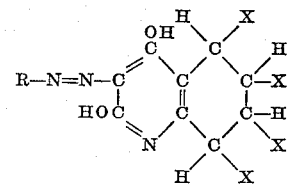

wherein R represents the residue of an aryl nucleus of the benzene series and X represents a member selected from the group consisting of hydrogen, a hydroxyl group, an alkyl group, an alkoxy group, an amino group, a halogen atom, a carboxyl group and a sulfo group.

5. The azo compounds having the general formula:

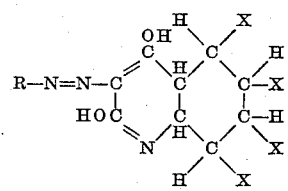

wherein R represents the residue of an aryl nucleus of the benzene series and X represents a member selected from the group consisting of hydrogen, a hydroxyl group, an alkyl group, an alkoxy group, an amino group, a halogen atom, a carboxyl group and a sulfo group.

6. The azo compounds selected from the group of azo compounds having the general formulae:

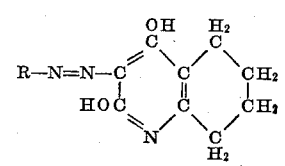

and

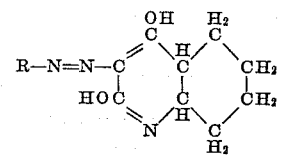

wherein R represents the residue of a member selected from the group consisting of an aryl nucleus of the benzene series, an aryl nucleus of the naphthalene series and a benzothiazole nucleus.

7. The azo compounds selected from the group of azo compounds having the general formulae:

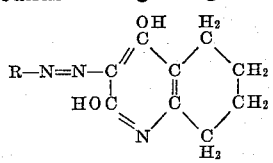

and

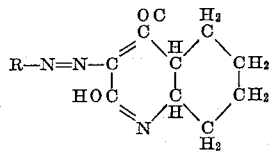

wherein R represents the residue of an aryl nucleus of the benzene series.

8. Textile material made of or containing a member selected from the group consisting of an organic derivative of cellulose, cotton, silk, wool and regenerated cellulose colored with an azo dye compound which has affinity for the material to be colored and which has the general formula:

$$R-N=N-R_1$$

wherein R represents the residue of a member selected from the group consisting of an aryl nucleus of the benzene series, an aryl nucleus of the naphthalene series and a benzothiazole nucleus and $R_1$ represents the residue of a 2,4-dihydroxyquinoline hydrogenated in positions 5 to 8 or 5 to 10, inclusive.

9. Material made of or containing an organic derivative of cellulose colored with a nuclear non-sulfonated azo dye compound having the general formula:

$$R-N=N-R_1$$

wherein R represents the residue of an aryl nucleus of the benzene series and $R_1$ represents the residue of a 2,4-dihydroxyquinoline hydrogenated in positions 5 to 8 or 5 to 10, inclusive.

10. A cellulose acetate colored with a nuclear non-sulfonated azo dye compound having the general formula:

$$R-N=N-R_1$$

wherein R represents the residue of a member selected from the group consisting of an aryl nucleus of the benzene series, an aryl nucleus of the naphthalene series and a benzothiazole nucleus and $R_1$ represents the residue of a 2,4-dihydroxyquinoline hydrogenated in positions 5 to 8 or 5 to 10, inclusive.

11. A cellulose acetate colored with a nuclear non-sulfonated azo dye compound having the general formula:

$$R-N=N-R_1$$

wherein R represents the residue of an aryl nucleus of the benzene series and $R_1$ represents the residue of a 2,4-dihydroxyquinoline hydrogenated in positions 5 to 8 or 5 to 10, inclusive.

12. A cellulose acetate colored with a nuclear non-sulfonated azo dye compound having the general formulae:

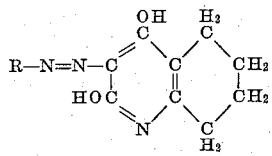

and

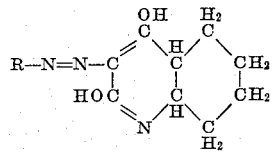

wherein R represents the residue of a member selected from the group consisting of an aryl nucleus of the benzene series, an aryl nucleus of the naphthalene series and a benzothiazole nucleus.

JOSEPH B. DICKEY.

CERTIFICATE OF CORRECTION.

Patent No. 2,231,705.  February 11, 1941.

JOSEPH B. DICKEY.

It is hereby certified that error appears in the printed specification of the above numbered patent requiring correction as follows: Page 5, first column, lines 10 to 15 inclusive, claim 7, for that portion of the formula reading "OC" read --OH--; and that the said Letters Patent should be read
  C           C
with this correction therein that the same may conform to the record of the case in the Patent Office.

Signed and sealed this 29th day of April, A. D. 1941.

Henry Van Arsdale,
Acting Commissioner of Patents.

(Seal)